Jan. 10, 1933.　　　E. WILDHABER　　　1,893,572
GEARING
Filed Feb. 14, 1931　　　2 Sheets-Sheet 1

INVENTOR
Ernest Wildhaber

Jan. 10, 1933. E. WILDHABER 1,893,572
GEARING
Filed Feb. 14, 1931 2 Sheets-Sheet 2
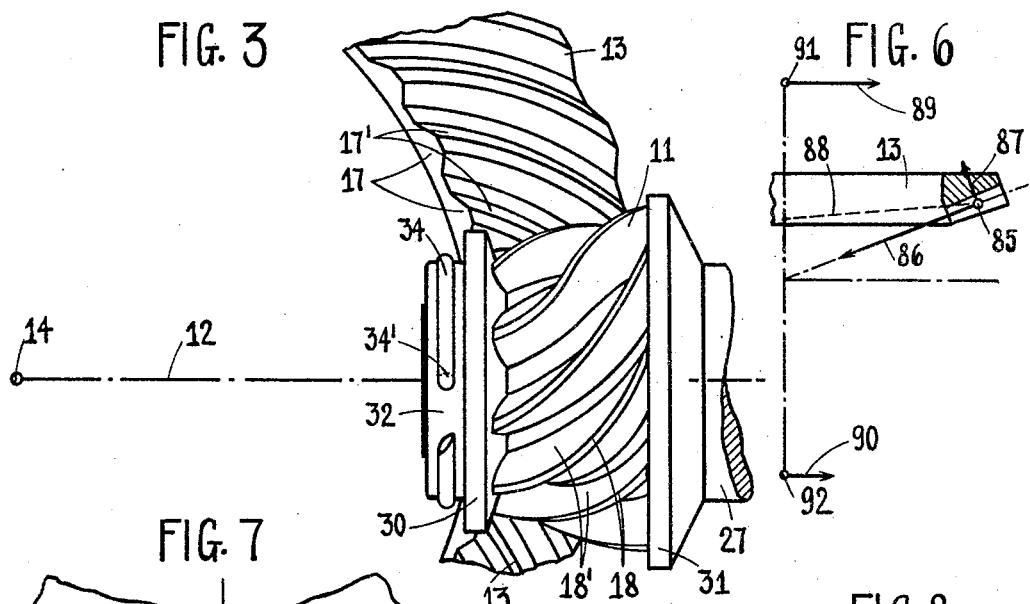
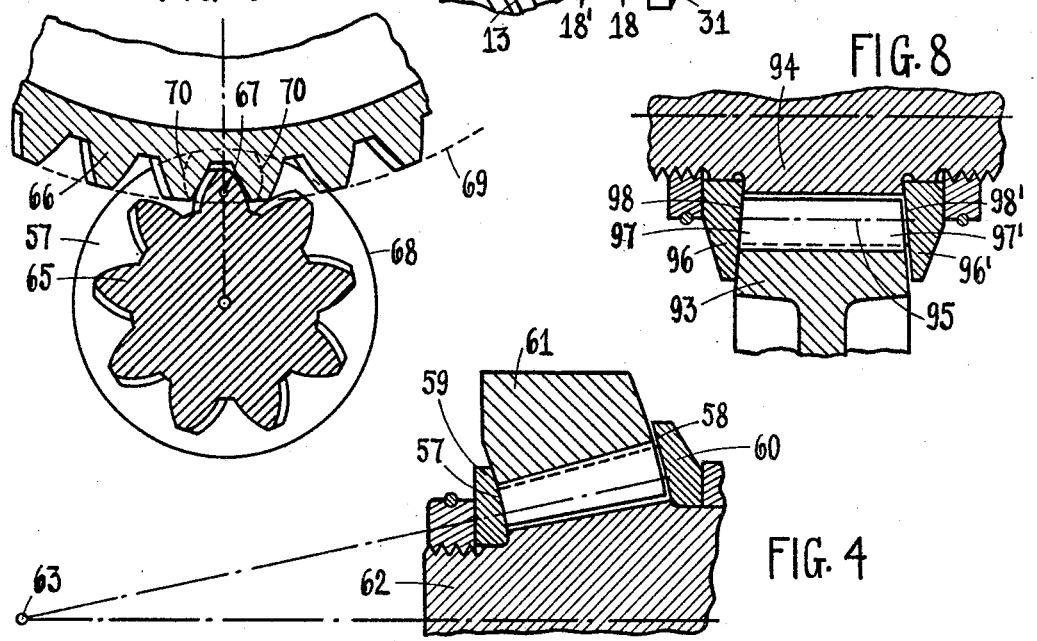
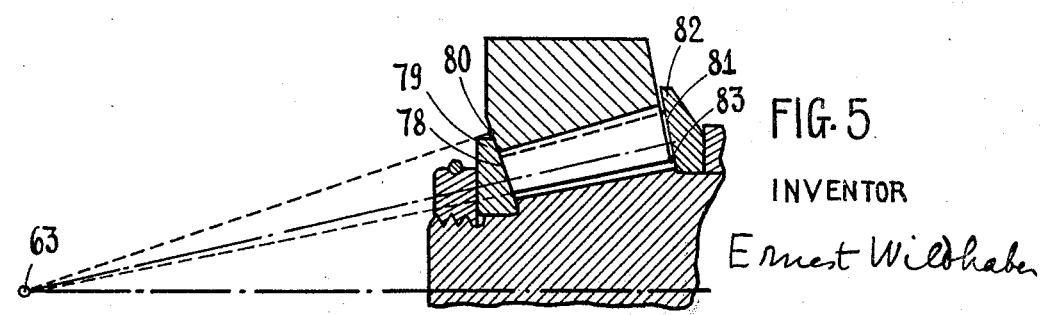
INVENTOR
Ernest Wildhaber Patented Jan. 10, 1933

1,893,572

UNITED STATES PATENT OFFICE

ERNEST WILDHABER, OF BROOKLYN, NEW YORK

GEARING

Application filed February 14, 1931. Serial No. 515,771.

The present invention relates to improvements in gearing, and particularly to gears with teeth inclined to the straight generatrices of the pitch surfaces, such as spiral bevel gears, helical gears, and curved tooth gears having inclined teeth.

The invention resides in a novel disposition and shape of thrust rings in gear pairs, and in novel combinations of parts.

One object of the present invention is to devise gearing having a smooth and noiseless operation and large load capacity at comparatively small cost. The first named features may be obtained by providing teeth of comparatively large inclination with respect to the straight generatrices of the respective pitch surfaces. A large tooth inclination results in a large number of simultaneously contacting teeth, which in turn is known to result in quiet operation. A large tooth inclination, that is to say a large spiral angle in bevel gearing or a large helix angle in helical gearing, further furnishes less curved tooth profiles, which terminate at a larger distance inside of the pitch surface. This feature is particularly appreciated on the pinion or smaller member of a gear pair.

The drawbacks hitherto encountered in gearing with large tooth inclination are the increased bearing loads, which necessitate the provision of more expensive bearings, and the reduced resistance of the teeth against bending and breakage.

The present invention aims to eliminate the thrust loads at least from the pinion bearings, and to reduce the radial loads to amounts equal to the loads of straight tooth gears.

A further important object is to devise a pair of gears having large spiral angles or helix angles, in which the teeth on one of said gears are stiffened and reinforced through engagement with a thrust member to be described hereafter.

A further object of several embodiments of the present invention is to reinforce spiral or helical teeth of a pinion by means of one or two members secured to said pinion, and to reinforce the teeth of a mating gear through the contact of the tooth ends with said members.

A still other aim in view is to provide engagement between a pair of gears in a manner that torsional vibrations are damped.

A further object is to provide gear pairs having comparatively narrow faces and being suited to operate without noise also at the highest of speeds.

In hardened spiral bevel gearing used in automotive axles it is at present customary to provide adjustment means, with which the pinion may be moved a slight amount in the direction of its axis, so that it may be set to its best running position.

Further objects of the present invention are to eliminate said adjustment means, to effect said adjustment with thrust rings, serving also another purpose, as will be fully described, and to simplify the design of the carrier portion which contains the pinion bearings.

Other objects will appear in the course of the specification and from recital of the appended claims.

My invention is exemplified in the accompanying drawings, in which

Fig. 3 is a partial front view corresponding to Fig. 1 and substantially also corresponding to Fig. 2.

Fig. 4 is a partial axial section through the zone of mesh of a pair of bevel gears, and through adjacent parts, illustrative of a further modification of the present invention.

Fig. 5 is a partial axial section similar to Fig. 4, and illustrative of a still other modification.

Fig. 6 is a diagram explanatory of the effect of the present invention on bearing loads.

Fig. 7 is a circumferential section through the meshing teeth of a pair of gears, showing also a thrust ring constructed in accordance with the present invention.

Fig. 8 is an axial section through the region of tooth engagement of a pair of gears rotatable on parallel axes, illustrative of a further embodiment of the present invention.

Figures 1, 2:
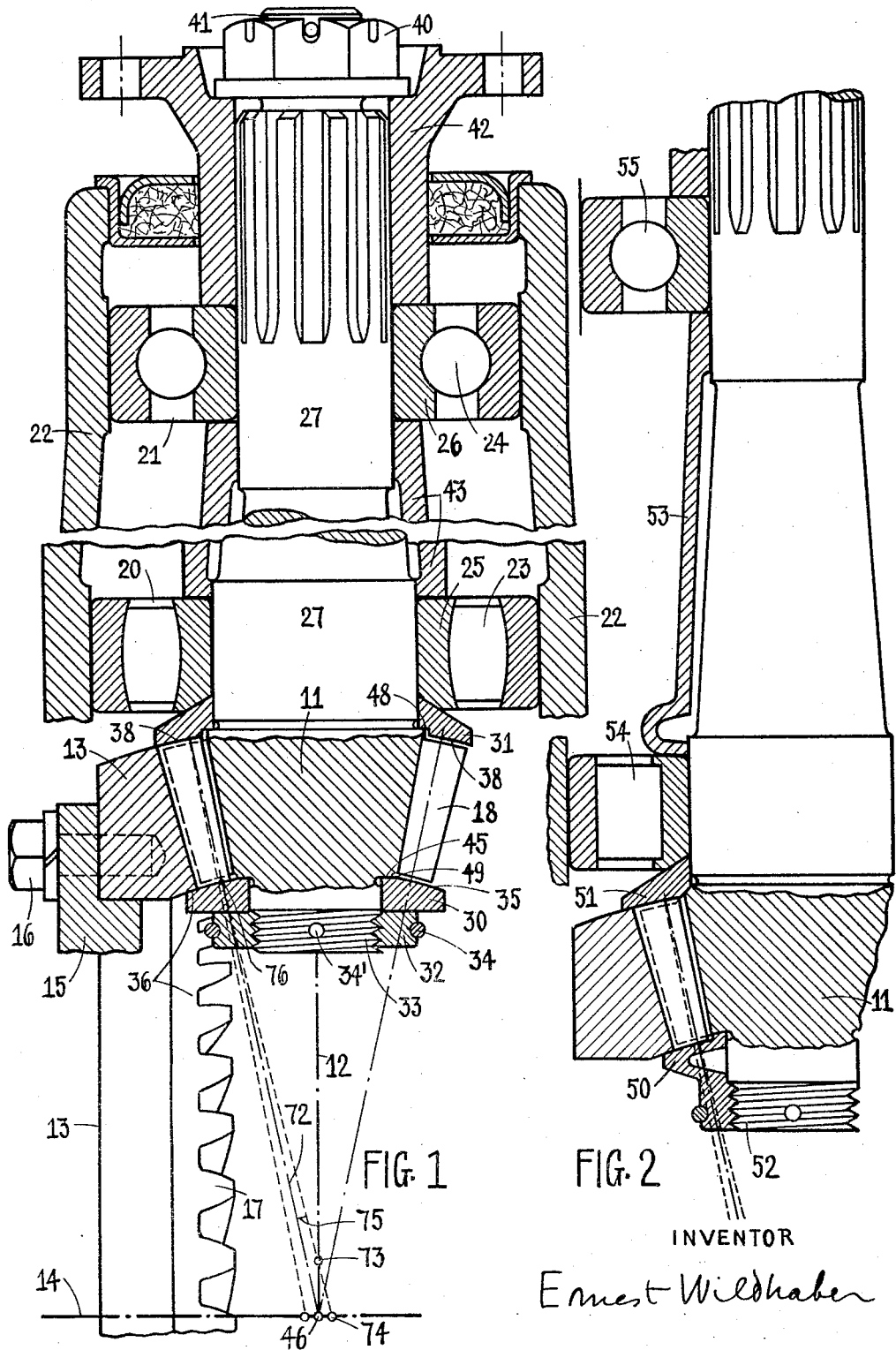
Fig. 1 is a view, partly an axial section, of the chief elements of a spiral bevel gearing constructed in accordance with the present invention.
Fig. 2 is a partial view and axial section of the chief elements of another spiral bevel gearing, illustrative of a modified embodiment of the present invention.

In Fig. 1 and Fig. 3 numeral 11 denotes a pinion rotatable on an axis 12 and meshing with a gear 13 having an axis 14 intersecting axis 12. Gear 13 is rigidly secured to a part 15 by suitable means such as screws 16. Part 15 is journalled in known manner in bearings omitted in the drawings. Gear 13 and mating pinion 11 contain spiral teeth 17 and 18 respectively, which have a comparatively large inclination with respect to the straight generatrices of the respective conical pitch surfaces.

The tooth pressure resulting from the inclined teeth tends to move the pinion axially with respect to gear 13. Such tendency is counteracted in conventional arrangements by providing a pinion bearing capable to transmit axial thrust loads, and by tightly securing the axial position of such bearing.

In accordance with the present invention pinion 11 is mounted in bearings 20, 21, none of which is held axially, but which are both free to move axially in a portion 22, which forms part of the carrier on which also the gear 13 is mounted. Bearings 20, 21 are of known antifriction type, the cages for rollers 23 and for balls 24 being omitted in the drawings. The inner races 25, 26 of said bearings are secured to a shaft projection 27 formed integral with pinion 11.

To stop the aforesaid tendency of axial displacement, thrust rings 30, 31 are provided in accordance with the present invention. Thrust ring 30 is secured to pinion 11 adjacent the small end of its teeth 18, by means of a nut 32 which engages a screw thread 33 formed on a projection of pinion 11. Nut 32 is locked in position in known manner, by means of a wire 34 which is bent to pass through a hole 34' made in thread 33 for the purpose. Thrust ring 30 contains a surface of revolution 35 suited to contact with one end of the teeth of gear 13. Preferably ring 30 is made of larger diameter than the outside diameter of the adjacent end of the pinion teeth 18, so that it reaches beyond the tooth bottoms of gear 13 and engages also a continuous zone (36) extending along the tooth roots of the gear.

Gear 13 contacts with thrust ring 30, when tooth contact is made on one side of the teeth, namely when tooth contact is made between the concave sides 18' of pinion teeth 18 and the convex sides 17' of gear teeth 17. The other thrust ring 31 is provided for taking up endwise thrust when tooth contact is made on the other side of the teeth, namely when tooth contact is made between the convex sides of the pinion teeth and the concave sides of the gear teeth. In an automotive axle, the two thrust rings 30, 31 correspond to driving and to coasting.

Thrust ring 31 contains a surface of revolution 38 suited to engage gear 13, namely on the adjacent end of its teeth. Thrust ring 31 is secured to pinion 11 by means of a nut 40, which engages a thread 41 formed on an extension of shaft 27. Pressure is transmitted between nut 40 and thrust ring 31 through several intermediate elements known in the art, namely a washer, a part 42 for transmitting torque, inner bearing race 26, a spacer 43, and inner bearing race 25.

Thrust ring 30 contacts with pinion 11 along a surface 45 which determines the axial position of a given thrust ring with respect to the pinion. In the illustrated instance moreover surface 45 is a plane. It should be noted that said surface is not merely an extension of surface of revolution 35, which is suited to engage gear 13. In other words the thrust ring 30 contains a surface for engaging gear 13, and another surface (45) for contacting with the pinion and for determining the axial position of the thrust ring with respect to the pinion.

This arrangement is intended especially for the final drive of automotive vehicles, and more broadly for hardened spiral bevel gears.

With this disposition the now usual adjusting means for setting the axial position of the pinion may be done away with, as follows: For quantity production, a set of rings or disks 30 are provided, each of which contains a surface 35 and a surface 45. Different rings have the surfaces 35 and 45 arranged in different axial relation to each other, so that their center points have different axial distances from each other. It is understood that the differences are small and amount to a few thousandths of an inch only. After the best running position of a pair of gears has been determined in the usual manner, the pinion may be set to such position by choosing a suitable thrust ring of said set. For instance if the concave side of a pinion meshes best and is most quiet in a position where the pinion is set axially nearer to the apex than the average, then a thrust ring 30 is selected, whose surface 45 stands further back from surface 35, than on the average. This provision will set the pinion relatively to the gear in a position nearer to the apex (46), inasmuch as the pinion derives its axial position from the gear.

The axial relation between the surfaces 35 and 45 controls therefore the axial position of the pinion, when the concave side of the pinion teeth is in mesh. Similarly the axial relation of the two surfaces 38 and 48 of thrust ring 31 controls the axial position of the pinion, when the convex side of the pinion teeth is in mesh. Thrust rings 30 and 31 are therefore so selected as to furnish the best running positions of a pinion.

As described above, the pinion adapts its axial position to the gear. Even if the gear should be somewhat eccentric, that is to say if the gear is fastened to part 15 in a manner that the gear teeth are not fully concentric with the turning axis of the gear, no harm results therefrom, as the pinion follows the gear somewhat like a phonograph needle follows an eccentric record. This advantage is unobtainable with the conventional disposition, where gear eccentricity causes imperfect tooth engagement and noise.

Different axial relations of the surfaces 35 and 45 to each other, or different axial distances of the center points of said surfaces manifest themselves through different diameters of the circle (49), at which plane surface 45 joins surface of revolution 35. Disks having surfaces 35, 45 of comparatively large axial distance show comparatively large circles 49; and disks having surfaces 35, 45 of smaller axial distance show smaller circles 49.

Preferably the surface (45) which contacts with the pinion in a manner to determine the axial position of the thrust ring (30) stands back from the surface of revolution (35), with which the thrust ring contacts with the gear. Similarly plane surface 48 of thrust ring 31 stands back from surface of revolution 38. With this arrangement the surfaces 35, 38, which should be very smooth, may be lapped more easily. Surfaces 35, 38 are preferably made spherical surfaces, as will be further described.

When the thrust rings are used also for pinion adjustment, the surfaces 45 or 48 ordinarily do not contact with the ends of the pinion teeth. There is a very slight clearance between said surfaces and the ends of the pinion teeth, which has been pointed out in the drawings with much exaggeration.

The surfaces of gear 13, which are engaged by the thrust rings 30 and 31, are accurately finished. They may be ground, if so desired.

In the embodiment indicated in Fig. 1 and Fig. 3, dimensions are so selected, that the two thrust rings do not contact simultaneously with gear 13, or not contact under pressure.

The embodiment indicated in Fig. 2 differs from the just described embodiment in that thrust rings 50, 51 are provided which are yieldingly secured to pinion 11. So thrust ring 50 is resilient, that is to say it is so shaped as to be slightly deflected under load. Thrust ring 50 is secured to pinion 11 by means of a threaded projection 52 of pinion 11, which engages an internal thread provided in ring 50. Thrust ring 51 is secured to pinion 11 in the same general manner as thrust ring 31, spacer 53 being however shaped so as to give more elastic deflection under load than spacer 43 (Fig. 1).

The pinion is mounted in antifriction bearings 54, 55 of known type, whose outer races are free to move axially.

Provision of resilience in the direction of the pinion axis increases the axial displacement of the pinion substantially in proportion to the load, as is readily understood. Such increase of the axial displacement is desirable in spiral bevel gearing and in other curved tooth gearing, because it compensates partly the effect of radial displacement sustained under load. Some radial displacement is unavoidable under load, and is due to compression of the bearing races and rolling elements and to the stress in the carrier which holds the outer races of the gear bearings and pinion bearings.

With the arrangement indicated in Fig. 2, dimensions may be so selected that the two thrust rings contact simultaneously with gear 13 with a given initial load. Such provision is desirable in many cases, as it tends to further counteract gear noise and to damp torsional vibrations.

In the embodiment indicated in Fig. 4, the surfaces of revolution 57, 58 with which the thrust rings 59, 60 bear against corresponding surfaces of gear 61 are substantially spherical surfaces. The center of said spherical surfaces coincides with the joint apex 63 of gear 61 and pinion 62. Convex spherical surface 57 engages a surface of the gear, which contains the same or substantially the same profile in an axial plane as surface 57. In other words convex spherical surface 57 engages a concave spherical surface of the gear, centered also in apex 63. Likewise concave spherical surface 58 engages a convex spherical surface of the gear. Inasmuch as the centers, and therefore also the radii of the contacting spherical surfaces are alike, the contacting surfaces engage each other on the entire area of overlap.

The effect of this arrangement will now be explained with reference to Fig. 7, which is a circumferential section applying to most embodiments of my invention. The two gears 65, 66 mesh with each other in a manner that their pitch circles roll on each other without sliding. The pitch circles, which are omitted in Fig. 7, contact with each other in pitch point 67. Relative sliding between the two gears 65, 66 or between parts connected with said gears, is in direct proportion to the distance of a considered point of contact from pitch point 67, as is well known. The area of overlap of a surface 57 and gear 66 extends between the outside circle 68 of said surface and the outside circle 69 of gear 66, and is seen to extend to a considerable distance from pitch point 67. Accordingly there is considerable sliding adjacent the intersection of the two circles 68 and 69, and to avoid undue friction and wear it is desirable to relieve the pressure there, so that the surfaces of the thrust ring and of gear 66 contact only in points adjacent pitch point 67. By reducing the area of contact to an area as indicated in dotted lines 70, as an example, friction is reduced while nevertheless the contacting surfaces are still strong enough to resist being crushed or worn under the heavy thrust loads. The load carrying capacity of surfaces contacting in this manner is known to increase with increasing intimacy of contact, that is to say the more one surface follows the other. Accordingly I localize the contact just sufficiently to reduce friction and improve lubrication, while keeping the area of tooth contact still large enough to prevent disastrous stresses.

The area of contact may be reduced by changing the inclination of the profiles of the contacting surfaces, or in other words by changing the inclination of the normals of said surfaces.

In the embodiment indicated in Fig. 1 and Fig. 3 the normals of surface 35 are so inclined to pitch line 72 that they intersect the pinion axis 12 between the apex 46 and the pinion body. Preferably surface 35 is made a spherical surface having a center 73, and the normals of surface 35 then intersect pinion axis 12 in point 73, which is between apex 46 and the pinion body.

The gear surface which is engaged by surface 35, may be made a concave spherical surface having a center at point 74. On account of the smaller radius of the convex spherical surface 35, the contact between the convex spherical surface 35 and said concave spherical surface of the gear is localized, namely to a degree depending on the difference of the radii of said surfaces, or also depending on the position of centers 73, 74.

Instead of being both spherical surfaces, both or one of said surfaces may differ from a spherical surface. For instance the said two surfaces may have a joint profile in the plane of the axes of gear 13 and pinion 11. Such joint profile may for instance be centered at point 73, or at another point so disposed that the normals intersect axis 12 between apex 46 and the pinion body. In all cases the contact between surface 35 and the corresponding surface of the gear 13 will be localized in circumferential direction through such disposition, namely to points adjacent the plane of the axes 12 and 14.

The degree of localization of contact depends on an angle 75. Angle 75 of any point of surface 35 is the angle included between the normal at said point and a radius drawn from said point to apex 46. At a point 76 of the pitch surface, angle 75 is the inclination of the normal of surface 35 with respect to the pitch surface. Often this angle is sufficient to characterize a surface 35.

In order to keep stresses low, I preferably keep this angle small, namely between five minutes and ten degrees referring to the average angle.

Concave surface 38 of thrust ring 31 is also formed to furnish a localized area of contact with the gear 13. The normals of surface 38 intersect the pinion axis on the opposite side of the apex 46 as compared with the position of the gear body. Likewise the average angle of the normals and the radii drawn through apex 46 is kept preferably between five minutes and ten degrees, usually nearer to the low value.

Another modification is indicated in Fig. 5. Surface 78 of thrust ring 79 is a convex conical surface, having a straight profile in the plane of the axes of the gear pair. The gear surface engaged by surface 78 is a concave conical surface contacting with surface 78 along said straight profile. Point 80 is the projection of apex 63 to said straight profile. Point 80 is disposed at the outward end or outside of surface 78, to obtain the desired moderate localization of the area of contact. Surface 81 of thrust ring 82 is a concave conical surface of such inclination, that the projection 83 of apex 63 is disposed at the inner end of surface 81 or further inside than said inner end.

The term thrust ring is here used in its broad meaning of thrust member, and is meant to include also members without hole, the term ring being always applicable to the thrust surfaces (such as 35, 38) which are necessarily of ring form. Also it should be understood that the term spiral bevel gears is intended to include all bevel gears having teeth inclined to the straight generatrices of their pitch surfaces, regardless of whether said teeth are straight or curved in development of a pitch surface to a plane.

Further it is obvious that instead of two thrust rings a single thrust ring may be employed, particularly in such cases, where load is transmitted in one direction only.

Fig. 6. illustrates the influence of thrust rings on the radial loads of a spiral bevel gear 13. The loads exerted on the gear teeth at a mean point 85 can be resolved into an endwise component 86, into a normal component 87, and into a torque component, which is perpendicular to the plane of the drawings. Components 86 and 87 together furnish a load in the direction of line 88. It produces substantial load components 89, 90 on the gear bearings 91, 92, indicated by points.

The provision of thrust rings eliminates the component 86 on the gear as well as its reaction on the pinion. In this case very small loads will take the place of the components 89, 90. It can be demonstrated that at a tooth inclination of 45° the total radial loads of the two gear bearings average 40 percent more when no thrust rings are provided. The percentage is still larger with increasing tooth inclination or spiral angle.

Preferably one of the gear bearings 91, 92 is so selected and secured to its carrier, that it may transmit axial thrust load at least in one direction. This may be accomplished in automotive axles with the conventional arrangement of gear bearings, which also comprises means for axially adjusting the gear, as desirable also here.

Fig. 8 illustrates an embodiment of the present invention applied to gears mounted on parallel axes, particularly to helical gears. Gear 93 meshes with a mating pinion 94 in a manner that their pitch surfaces contact along a line 95. A pair of thrust rings 96, 96' are secured to pinion 94 adjacent the two ends 97, 97' of its teeth. The thrust rings 96, 96' contain surfaces of revolution 98, 98' contacting with said ends 97, 97'. They are pressed against said ends by nuts or other suitable means.

The natural deflection of said teeth under load is substantially in a direction normal to the teeth. Inasmuch as the teeth are inclined to the straight generatrices of their pitch surface, their deflection is also inclined to the surfaces of revolution 98, 98'. Surfaces 98, 98' and rings 96, 96' therefore hamper natural deflection and thereby stiffen said teeth.

Such stiffening and reinforcement is especially appreciated when the teeth include large angles with the straight generatrices of their pitch surface.

For reasons already explained, the normals of the surfaces 98, 98' are inclined to the pitch surface of pinion 94, the inclination angle being preferably between five minutes (5') and ten degrees (10°). In the illustrated instance, surfaces 98, 98' are conical surfaces and suited to contact with or to engage the tooth ends of gear 93. Through such contact the thrust rings 96, 96' also stiffen the gear teeth and prevent undue deflection.

On account of the increased strength obtained with thrust rings contacting with the tooth ends of the pinion, I may provide this feature also on gear pairs whose mesh is dependent on the axial position of the pinion, such as spiral bevel gears, namely especially when such gears are either not hardened, or when they would be very accurately ground after hardening, so that the hardening distortions are removed.

The axial distance of the gear surfaces which contact with surfaces 98, 98' is made such that only one of said surfaces is in contact under pressure at a time.

It is noted from the drawings that the surfaces 98, 98' of the thrust rings 96, 96' (Fig. 8), or also the surfaces 35, 38 of thrust rings 30, 31 (Fig. 1) are diverging in a direction outwardly from the axis of the gear or pinion, to which said thrust rings are secured. Moreover the pinion teeth are slightly longer at the top than at the tooth bottom (Fig. 8), inasmuch as the tooth ends contact with said surfaces 98, 98'.

A thrust ring (96, 96') is ordinarily secured against turning through ample frictional resistance. Friction results through the pressure of tightening the rings axially on the pinion (94) to which they are secured. Furthermore a tight fit may be provided between the pinion and the hole of a thrust ring, so that said friction is further increased. If so desired, a thrust ring may be positively secured against turning on the pinion (94) to which it is fitted, for instance by means of a key or splines.

Various changes and modifications may be made in my invention by simply applying customary practice and the established knowledge of the art, and without departing from the spirit of my invention. For definition of its scope, it is relied on the appended claims.

What I claim is:

1. Spiral bevel gearing, comprising a gear and a mating pinion having spiral teeth, a thrust ring secured to said pinion for controlling the axial position of said pinion, said thrust ring containing a surface of revolution suited to bear against tooth ends of said gear, the profile of said surface in an axial section being curved and inclined to a plane perpendicular to the axis of the pinion.

2. Spiral bevel gearing, comprising a gear and a mating pinion having spiral teeth, a thrust ring secured to said pinion for controlling the axial position of said pinion, said thrust ring containing a surface of revolution suited to bear against tooth ends of said gear, said surface extending beyond the tooth bottom of said gear to a larger diameter than the adjacent ends of the pinion teeth, the profile of an axial section of said surface being inclined to a plane perpendicular to the pinion axis.

3. Spiral bevel gearing, comprising a hardened gear and a mating hardened pinion suited to intermesh in a manner depending on the axial position of the pinion, a thrust ring secured to said pinion for controlling the axial position of said pinion, said thrust ring containing a surface suited to engage said gear and another surface suited to contact with the pinion and to determine the axial position of said thrust ring with respect to said pinion, said thrust ring being selected after testing said gear and pinion so that the axial distance of said surfaces depends on the tested mesh of said gear and pinion.

4. Spiral bevel gearing, comprising a hardened gear and a mating hardened pinion suited to intermesh in a manner depending on the axial position of the pinion, a thrust ring secured to said pinion for controlling the axial position of said pinion, said thrust ring containing a surface suited to engage one end of the teeth of said gear and another surface suited to contact with the pinion and to determine the axial position of said thrust ring with respect to said pinion, said thrust ring being selected after testing said gear and pinion, so that the axial distance of said surfaces depends on the tested mesh of said gear and pinion.

5. A set of thrust rings for controlling the axial position of hardened spiral bevel pinions of equal design, a thrust ring containing a surface suited to engage the mating gear of said pinion and another surface suited to contact with the pinion and to determine the axial position of said thrust ring with respect to said pinion, said set containing thrust rings having the center points of said surfaces disposed at predetermined different axial distances from each other.

6. A thrust ring for controlling the axial position of hardened spiral bevel pinions, containing a surface suited to contact with a pinion adjacent the small end of its teeth and to determine the axial position of said thrust ring with respect to said pinion, said thrust ring containing also another surface suited to engage the tooth ends of the mating gear of said pinion, said other surface being a convex and substantially spherical surface.

7. A thrust ring for controlling the axial position of hardened spiral bevel pinions, containing a surface suited to contact with a pinion adjacent the large end of its teeth and to determine the axial position of said thrust ring with respect to said pinion, said thrust ring containing also another surface suited to engage the mating gear of said pinion, said other surface being a concave and substantially spherical surface.

8. Spiral bevel gearing, comprising a gear and a mating pinion having spiral teeth, a thrust ring secured to said pinion adjacent the large end of its teeth, said thrust ring containing a surface of revolution for engaging said gear, and another surface suited to contact with the pinion in a manner to determine the axial position of said thrust ring with respect to said pinion, said other surface standing back from the first named surface.

9. Spiral bevel gearing, comprising a gear and a mating pinion having spiral teeth, a thrust ring secured to said pinion adjacent the small end of its teeth for controlling the axial position of said pinion, said thrust ring containing a surface of revolution suited to engage the small end of the teeth of said gear, the normals of said entire surface intersecting the pinion axis between the apex and the pinion body.

10. Spiral bevel gearing, comprising a gear and a mating pinion having spiral teeth, a thrust ring secured to said pinion adjacent the large end of its teeth for controlling the axial position of said pinion, said thrust ring containing a concave spherical surface suited to engage the large end of the teeth of the mating gear, the center of said spherical surface being disposed on the pinion axis further outside than the pinion apex.

11. Gearing, comprising a gear and a mating pinion having teeth inclined to the straight generatrices of their pitch surfaces, a thrust ring secured to said pinion adjacent one end of its teeth for controlling the axial position of said pinion, said thrust ring containing a surface of revolution suited to engage said gear on one end of its teeth and on a zone adjacent the tooth roots of said gear, the normals of said surface of revolution having a general inclination between five minutes and ten degrees to the pitch surface of said pinion.

12. Gearing, comprising a gear and a mating pinion having teeth inclined to the straight generatrices of their pitch surfaces, a thrust ring yieldingly secured to said pinion adjacent one end of its teeth for controlling the axial position of said pinion, said thrust ring containing a surface of revolution suited to engage the tooth ends of said gear, the normals of said surface having a general inclination to the pitch surface of said pinion.

13. Spiral bevel gearing, comprising a gear and a mating pinion having spiral teeth, a thrust ring secured to said pinion adjacent the large end of its teeth for controlling the axial position of said pinion, said thrust ring containing a surface of concave profile suited to bear against tooth ends of said gear, the normals of said profile intersecting the pinion axis beyond the pinion apex.

ERNEST WILDHABER.